(12) United States Patent
Zhang et al.

(10) Patent No.: US 11,725,115 B2
(45) Date of Patent: Aug. 15, 2023

(54) METHOD FOR PREPARING SELF-CLEANING ANTI-ICING COATING BASED ON BRUSHLIKE ORGANOSILICON

(71) Applicant: Northwestern Polytechnical University, Xi'an (CN)

(72) Inventors: Qiuyu Zhang, Xi'an (CN); Yi Tian, Xi'an (CN); Hepeng Zhang, Xi'an (CN); Baoliang Zhang, Xi'an (CN)

(73) Assignee: Northwestern Polytechnical University

( * ) Notice: Subject to any disclaimer, the term of this patent is extended or adjusted under 35 U.S.C. 154(b) by 86 days.

(21) Appl. No.: 17/526,188

(22) Filed: Nov. 15, 2021

(65) Prior Publication Data
US 2022/0154036 A1     May 19, 2022

(30) Foreign Application Priority Data
Nov. 16, 2020 (CN) .......................... 202011281324.9

(51) Int. Cl.
| | | |
|---|---|---|
| B29C 41/00 | (2006.01) |
| C09D 175/08 | (2006.01) |
| B29C 41/46 | (2006.01) |
| C08G 18/24 | (2006.01) |
| C08G 18/40 | (2006.01) |
| C08G 18/48 | (2006.01) |
| C08G 18/63 | (2006.01) |
| C08G 18/75 | (2006.01) |
| C09D 5/00 | (2006.01) |
| B29K 75/00 | (2006.01) |

(52) U.S. Cl.
CPC .......... *C09D 175/08* (2013.01); *B29C 41/003* (2013.01); *B29C 41/46* (2013.01); *C08G 18/246* (2013.01); *C08G 18/4072* (2013.01); *C08G 18/4854* (2013.01); *C08G 18/63* (2013.01); *C08G 18/755* (2013.01); *C09D 5/00* (2013.01); *B29K 2075/00* (2013.01)

(58) Field of Classification Search
CPC .... B29C 41/003; B29C 41/46; B29K 2075/00
See application file for complete search history.

(56) References Cited

FOREIGN PATENT DOCUMENTS

CN        107556477 A     1/2018

OTHER PUBLICATIONS

Zelinlan Wang and Zhiguang Guo, "Biomimetic Self-Slippery and Transferable Transparency Lubricant-Infused Functional Surfaces", Nanoscale. (Oct. 2018). 11 pgs.
Darryl L. Beemer, Wei Wang and Arun K. Kota, "Durable gels with ultra-low adhesion to ice," Materials Science, Journal of Materials Chemistry (Nov. 2016). 6 pgs.

*Primary Examiner* — James Sanders
(74) *Attorney, Agent, or Firm* — Lerner David LLP

(57) ABSTRACT

The present disclosure relates to a method for preparing a self-cleaning anti-icing coating based on brushlike organosilicon. In this method, a brushlike organosilicon-modified polyurethane coating is prepared by subjecting a thiolactone, a diamine compound and monovinyl-terminated polydimethylsiloxane to a simple multi-component click reaction to obtain a dihydroxy-terminated block, and introducing the dihydroxy-terminated block into a polyurethane matrix.

10 Claims, 2 Drawing Sheets

METHOD FOR PREPARING SELF-CLEANING ANTI-ICING COATING BASED ON BRUSHLIKE ORGANOSILICON

CROSS REFERENCE TO RELATED APPLICATION

This patent application claims the benefit and priority of Chinese Patent Application No. 202011281324.9 filed on Nov. 16, 2020, the disclosure of which is incorporated by reference herein in its entirety as part of the present application.

TECHNICAL FIELD

The present disclosure belongs to the field of materials science, relates to a method for preparing a coating material, and in particular, to a method for preparing a self-cleaning anti-icing coating based on brushlike organosilicon.

BACKGROUND ART

Icing and frosting is a very common natural phenomenon, but it brings potential safety hazards to industries of aviation, shipping, electric power, vehicles and energy. For example, icing on the surface of an aircraft may reduce safety performance of an aircraft such as maneuverability and stability, thus threatening flight safety. According to statistics, the probability of air crash caused by icing exceeds 15%. Structural corrosion and icing problems of Shenyang J-8 and Sukhoi Su-27 aircrafts have seriously affected the combat readiness of the aircrafts. In addition, icing of transmission lines, especially high-voltage transmission lines, may also cause a series of very serious economic losses. For example, in early 2008, China also experienced a rare large-scale, long-term freezing weather. The operation of power systems in 13 provinces was affected, in which the power grid of the most serious area was almost paralyzed, causing an indirect economic losses difficult to estimate.

Existing anti-icing/deicing methods mainly include active protection methods and passive protection methods. The active protection methods include physical methods (such as a mechanical deicing method and an electric heating anti-icing/deicing system) and chemical methods (such as spraying saline water, a deicing agent and an anti-icing fluid). The passive protection method is implemented by using an anti-icing coating. A mechanism of the passive anti-icing technology is mainly to reduce adhesion of water and ice to a matrix surface by building a coating with anti-icing functions on the matrix surface, so as to achieve the effect of preventing icing and delaying icing. The icing on the matrix surface is related to an interaction force between the matrix surface and water molecules. A greater intermolecular force indicates a higher adhesion strength of the ice. The coating surface may become a hydrophobic surface (that is, with a contact angle of greater than 90°) by changing the chemical composition of the coating surface and reducing surface energy of the coating, so that the adhesion between ice or water (before icing) and the surface could be reduced, thus achieving the effect of anti-icing or delaying icing. At first, researchers were inspired by the surface of a lotus leaf to prepare a super-hydrophobic structure that could capture some air on the surface to form an air layer, which hinders the entry of water vapor, thereby reducing ice adhesion. However, after exposing to a frost environment for a long time, the super-hydrophobic surface and ice will form a "mechanical interlocking" structure when the surface is completely iced, which greatly increases the difficulty of ice removal. In addition, researchers were inspired by the surface of common nepenthes to prepare a slippery liquid infused porous surface (SLIPS) anti-icing coating. Guo et al. used three common lubricating layers (perfluoropolyether, liquid paraffin and ethyl oleate) to soak the superhydrophobic surface, obtaining an SLIPS coating with excellent capability of delaying icing (Nanoscale, 2018, 10, 19879). Arun K. Kota's research group prepared a poly(dimethylsiloxane) (PDMS) gel with ultra-low surface energy. The gel could remove ice from the surface of the material by using the principle of pulse separation with relative small deicing force (J. Mater. Chem. A, 2016, 4, 18253-18258). However, PDMS alone still has problems such as insufficient mechanical properties and short durability. Therefore, against the phenomenon of icing, it is still an urgent problem to be solved in the field that how to prepare an anti-icing material with strong mechanical properties and good durability while being self-cleaning. Zhang et al. designed a fluorosilicone resin to prepare a super hydrophobic/double hydrophobic coating (No. CN2017107386707) by using a thiol-ene click chemistry method. The fluorosilicone resin could achieve a good self-cleaning effect when applying to a fabric, and however could not be used for anti-icing.

SUMMARY

The present disclosure is to solve the following technical problem.

To overcome the shortcomings of the prior art, the present disclosure provides a method for preparing a self-cleaning anti-icing coating based on brushlike organosilicon, which results in a good-durability self-cleaning anti-icing coating.

Technical Solution

A method for preparing a self-cleaning anti-icing coating based on brushlike organosilicon includes the following steps:

step 1, preparing a modified thiolactone: under nitrogen, mixing a solvent A, a thiolactone, a mercaptoalcohol and a base catalyst A in sequence to obtain a first mixture, and subjecting the first mixture to a thiol-ene addition reaction at ambient temperature for 1-3 h, to obtain the modified thiolactone, wherein a molar ratio of the thiolactone to the mercaptoalcohol is 1:1;

step 2, preparing a siloxane block: sequentially adding the modified thiolactone, a diamine and a siloxane into a reactor to obtain a second mixture, and subjecting the second mixture to an amino nucleophilic ring opening reaction and a thiol click reaction of thiolactone for 6-24 h to obtain the siloxane block, wherein a molar ratio of the modified thiolactone to the diamine to the siloxane is 2:1:2;

step 3, preparing a polyurethane matrix: under nitrogen, sequentially adding the solvent A, the siloxane block, a diol, a diisocyanate, a catalyst B and a chain extender into a reactor, and reacting at a temperature of 50-80° C. for 3-12 h to obtain the polyurethane matrix, wherein a molar ratio of the diisocyanate to a mixture of the diol and the siloxane block to the chain extender is in a range of (2-4):1:(1-3), a molar ratio of the diol to the siloxane block in the mixture of the diol and the siloxane block is in a range of 1:(0.01-0.2), and the solvent A accounts for 30%-80% of the total mass of the solvent A, the siloxane block, the diol, the diisocyanate, the catalyst B and the chain extender; and step 4, preparing a brushlike self-cleaning anti-icing coating: dissolving the polyurethane matrix in the solvent A to obtain a mixed solution with a concentration of 10%-50%, laying the mixed solution on a substrate by using a tape casting method, placing the substrate in a drying oven and heating for 18-36 h in a gradient heating manner from 50° C. to 120° C. by using an annealing method, and subjecting the substrate after heating to a vacuum drying at a temperature of 60-80° C. for 6-24 h to remove remaining solvent to obtain the brushlike self-cleaning anti-icing coating.

In some embodiments, the thiolactone is acrylamide thiolactone.

In some embodiments, the mercaptoalcohol is selected from the group consisting of 3-mercapto-1-propanol, 2-mercaptoethanol and 6-mercapto-1-hexanol.

In some embodiments, the base catalyst A includes but is not limited to triethylamine, dimethylphenylphosphine and a tributylphosphine basic compound.

In some embodiments, the siloxane is monovinyl-terminated polydimethylsiloxane.

In some embodiments, the solvent A includes but is not limited to tetrahydrofuran, dioxane (DOX) and n-butyl acetate.

In some embodiments, the diamine includes but is not limited to polyetheramine D 400, polyetheramine D 2000 and hexamethylene diamine.

In some embodiments, the catalyst B includes but is not limited to triethylamine, dibutyltin dilaurate (DBTDL) and triethylenediamine basic compound.

In some embodiments, the diisocyanate includes but is not limited to toluene diisocyanate (TDI), isophorone diisocyanate (IPDI), methylenediphenyl diisocyanate (MDI), dicyclohexylmethane diisocyanate (HMDI), hexamethylene diisocyanate (HDI) and lysinediisocyanate (LDI).

In some embodiments, the chain extender is a diol chain extender selected from the group consisting of ethylene glycol, propylene glycol, 1,4-butanediol, diethylene glycol, 1,4-cyclohexanediol, hydrogenated bisphenol A, terephthalyl alcohol, hydroquinone bis-β-hydroxyethyl ether and resorcinol hydroxy ether.

Benefit Effects

The present disclosure provides a method for preparing a self-cleaning anti-icing coating based on brushlike organosilicon. In this method, a brushlike organosilicon-modified polyurethane coating is prepared by subjecting a thiolactone, a diamine compound and monovinyl-terminated polydimethylsiloxane to a simple multi-component click reaction to obtain a dihydroxy-terminated block, and introducing the dihydroxy-terminated block into a polyurethane matrix. The coating with the special structure has characteristics of low surface energy of organosilicon and strong adhesion between the polyurethane coating and a substrate, and the special brushlike structure enables the coating to have a special liquid-like surface structure, so that the coating has excellent self-cleaning and antifouling properties. The coating has a maximum tensile strength reaching 48.62 MPa, an elongation at break of 1233% and a static water contact angle of 950 or above, and a minimum ice adhesion force of a surface of the coating could reach 15.4 kPa.

The present disclosure has the following advantages:

1. The self-cleaning anti-icing coating according to the present disclosure has good low surface energy performance and could be used for self-cleaning and antifouling of surfaces of buildings, ships, aircrafts and the like.

2. The self-cleaning anti-icing coating according to the present disclosure is made by a brushlike polymer that is prepared by a simple method, and has advantages of short preparation cycle and mass production. Besides, during the method, a self-delamination takes place, which results in a surface enriched in polymer with low surface energy and a matrix enriched in urethane bonds and hydrogen bonds, thus, making it possible to coat on most substrates while having good adhesion.

3. The self-cleaning anti-icing coating according to the present disclosure has good anti-icing performance.

4. The self-cleaning anti-icing coating according to the present disclosure has good wear resistance, and could still maintain the self-cleaning anti-icing performance after being polished by a woven fabric for many times.

DETAILED DESCRIPTION OF THE EMBODIMENTS

Figure 1:
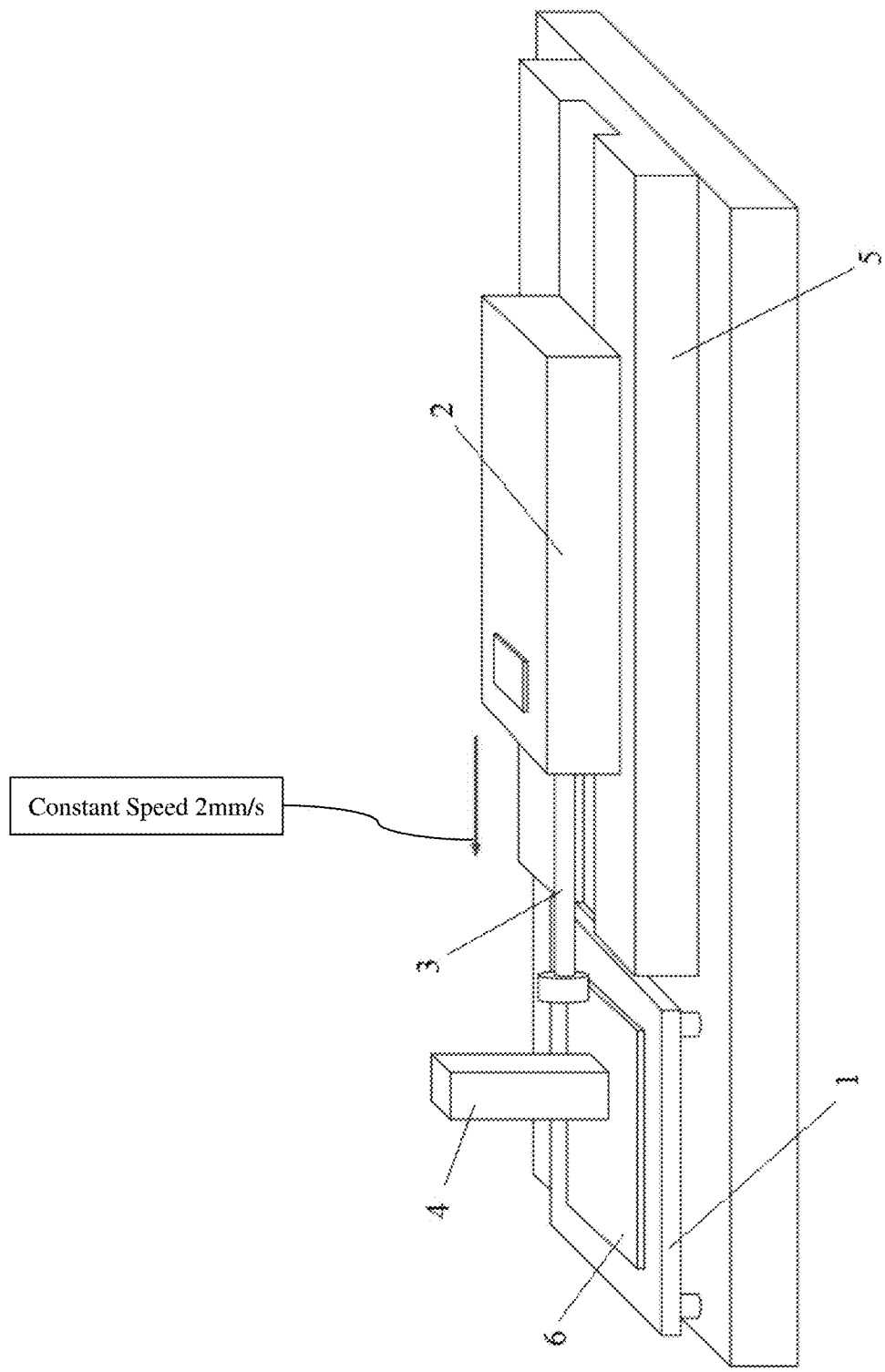
FIG. 1 is a schematic diagram of an ice adhesion test device.
Figure 2A:
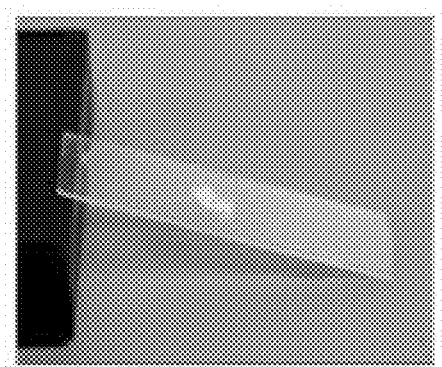
FIG. 2A shows a sample at the start of the surface self-cleaning performance test of Example 3.
Figure 2B:
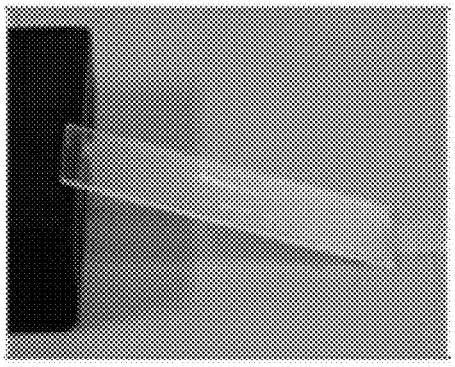
FIG. 2B shows a sample during the surface self-cleaning performance test of Example 3.
Figure 2C:
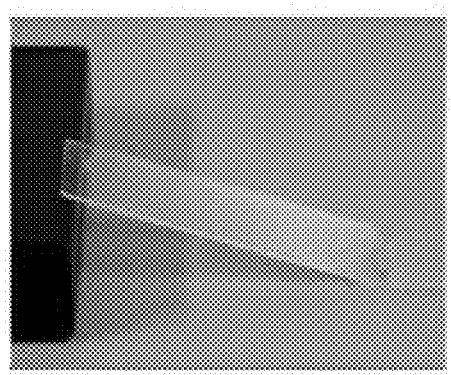
FIG. 2C shows a sample at the end of the surface self-cleaning performance test of Example 3.

The present disclosure is further described with reference to examples and accompanying drawings.

Example 1

Under nitrogen, 5.0 mL of dioxane, 0.10 mmol of acrylamide thiolactone, 0.10 mmol of 3-mercapto-1-propanol and 0.50 mL of triethylamine were respectively added into a reactor to obtain a first mixture, and the first mixture was subjected to a thiol-ene addition reaction at ambient temperature for 1 h, obtaining a modified thiolactone. 0.05 mmol of a diamine and 0.10 mmol of a siloxane were sequentially added in the reactor to obtain a second mixture, and the second mixture was sequentially subjected to an amino nucleophilic ring opening reaction and a thiol click reaction of thiolactone for 6 h, obtaining a siloxane block. Under nitrogen, 12 mmol of PTMEG, 6 mmol of IPDI, 50 μL of DBTDL and 6 mmol of BDO (dissolved in 5 mL of DOX) were sequentially added into a reactor and reacted at a temperature of 60° C. for 4 h, obtaining a resin matrix. 1 g of the resin matrix was taken and dissolved in 3 mL of DOX, obtaining a solution with a concentration of 25%. The solution was laid on a substrate by using a tape casting method, and the substrate was placed in a drying oven and heated for 18 h in a gradient heating manner from 50° C. to 120° C. by using an annealing method, and then subjected to a vacuum drying at a temperature of 60° C. for 6 h to remove remaining solvent, obtaining a brushlike self-cleaning anti-icing coating with a smooth and flat surface. The coating has a tensile strength of 6.5 MPa, a water contact angle of 93° determined by a contact angle experiment, and a delayed icing time of 5 min.

Ice adhesion test: An ice adhesion test device used mainly includes a cooling plate 1, a dynamometer (SUNDOO, SH-50N) comprising a force transducer 2 and a force probe 3, a plastic cuvette 4 (1*1*4.5 cm$^3$), and a motion stage 5. Firstly, a sample 6 to be tested was fixed on the cooling plate 1, a thermocouple was fixed at the bottom of the sample 6 to determine the test temperature, the cuvette 4 containing 1.5 mL of deionized water was put upside down on the surface of the sample 6 (icicle cross-sectional area $A_{ice}=1*1$ cm$^2$=1 cm$^2$), the whole test device was placed at a temperature of −12° C. for 6 h to ensure that the water frozen (with a cooling plate temperature of −12° C., an ambient temperature of 15° C., and a humidity of 50%) to an icicle, and the icicle was pushed horizontally by the force probe 3 vertical thereto at a constant speed of 2 mm/s. A maximum force ($F_{max}$) of the force probe 3 pushing the icicle is recorded as a force for removing ice from the surface of the sample, and the ice adhesion ($\tau_{ice}$) could be calculated by using the formula $\tau_{ice}=F_{max}/A_{ice}$. The foregoing process was repeated at least three times to ensure its repeatability.

According to the test, the sample has an $F_{max}$ of 4.60 N, and a $\tau_{ice}$ of 46.0 kPa.

Example 2

Under nitrogen, 5.0 mL of dioxane, 0.20 mmol of acrylamide thiolactone, 0.20 mmol of 3-mercapto-1-propanol and 1.0 mL of triethylamine were respectively added into a reactor to obtain a first mixture, and the first mixture was subjected to a thiol-ene addition reaction at ambient temperature for 3 h, obtaining a modified thiolactone. 0.10 mmol of a diamine and 0.20 mmol of a siloxane were sequentially added in the reactor to obtain a second mixture, and the second mixture was sequentially subjected to an amino nucleophilic ring opening reaction and a thiol click reaction of thiolactone for 18 h, obtaining a siloxane block. Under nitrogen, 8.0 mmol of PTMEG, 2.0 mmol of IPDI, 150 μL of DBTDL and 6.0 mmol of BDO (dissolved in 5 mL of DOX) were sequentially added into a reactor and reacted at a temperature of 80° C. for 6 h, obtaining a resin matrix. 1 g of the resin matrix was taken and dissolved in 4 mL of DOX, obtaining a solution with a concentration of 20%. The solution was laid on a substrate by using a tape casting method, and the substrate was placed in a drying oven and heated for 24 h in a gradient heating manner from 50° C. to 120° C. by using an annealing method, and then subjected to a vacuum drying at a temperature of 60° C. for 8 h to remove remaining solvent, obtaining a brushlike self-cleaning anti-icing coating with a smooth and flat surface. The coating has a tensile strength of 18 MPa, a water contact angle of 990 determined by a contact angle experiment, and a delayed icing time of 7 min.

Ice adhesion test: An ice adhesion test device used mainly includes a cooling plate 1, a dynamometer (SUNDOO, SH-50N) comprising a force transducer 2 and a force probe 3, a plastic cuvette 4 (1*1*4.5 cm$^3$), and a motion stage 5. Firstly, a sample 6 to be tested was fixed on the cooling plate 1, a thermocouple was fixed at the bottom of the sample 6 to determine the test temperature, the cuvette 4 containing 1.5 mL of deionized water was put upside down on the surface of the sample 6 (icicle cross-sectional area $A_{ice}=1*1$ cm$^2$=1 cm$^2$), the whole test device was placed at a temperature of −12° C. for 6 h to ensure that the water frozen (with a cooling plate 1 temperature of −12° C., an ambient temperature of 15° C., and a humidity of 50%) to an icicle, and the icicle was pushed horizontally by the force probe 3 vertical thereto at a constant speed of 2 mm/s. A maximum force ($F_{max}$) of the force probe 3 pushing the icicle is recorded as a force for removing ice from the surface of the sample, and the ice adhesion ($\tau_{ice}$) could be calculated by using the formula $\tau_{ice}=F_{max}/A_{ice}$. The foregoing process was repeated at least three times to ensure its repeatability.

According to the test, the sample has an $F_{max}$ of 1.94N, and a $\tau_{ice}$ of 19.4 kPa.

Example 3

Under nitrogen, 5.0 mL of dioxane, 0.10 mmol of acrylamide thiolactone, 0.10 mmol of 3-mercapto-1-propanol and 0.50 mL of triethylamine were respectively added into a reactor to obtain a first mixture, and the first mixture was subjected to a thiol-ene addition reaction at ambient temperature for 1 h, obtaining a modified thiolactone. 0.05 mmol of a diamine and 0.10 mmol of a siloxane were sequentially added in the reactor to obtain a second mixture, and the second mixture was sequentially subjected to an amino nucleophilic ring opening reaction and a thiol click reaction of thiolactone for 6 h, obtaining a siloxane block. Under nitrogen, 16 mmol of PTMEG, 4 mmol of IPDI, 50 μL of DBTDL and 12 mmol of BDO (dissolved in 5 mL of DOX) were sequentially added into a reactor and reacted at a temperature of 70° C. for 10 h, obtaining a resin matrix. 1 g of the resin matrix was taken and dissolved in 2 mL of DOX, obtaining a solution with a concentration of 33%. The solution was laid on a substrate by using a tape casting method, and the substrate was placed in a drying oven and heated for 18 h in a gradient heating manner from 50° C. to 120° C. by using an annealing method, and then subjected to a vacuum drying at a temperature of 60° C. for 12 h to remove remaining solvent, obtaining a brushlike self-cleaning anti-icing coating with a smooth and flat surface. The coating has a tensile strength of 32.95 MPa, a water contact angle of 95.870 determined by a contact angle experiment, and a delayed icing time of 7 min.

Ice adhesion test: An ice adhesion test device used mainly includes a cooling plate 1, a dynamometer (SUNDOO, SH-50N) comprising a force transducer 2 and a force probe 3, a plastic cuvette 4 (1*1*4.5 cm$^3$), and a motion stage 5. Firstly a sample 6 to be tested was fixed on the cooling plate, a thermocouple was fixed at the bottom of the sample 6 to determine the test temperature, the cuvette 4 containing 1.5 mL of deionized water was put upside down on the surface of the sample 6 (icicle cross-sectional area $A_{ice}=1*1$ cm$^2$=1 cm$^2$), the whole test device was placed at a temperature of −12° C. for 6 h to ensure that the water frozen (with a cooling plate 1 temperature of −12° C., an ambient temperature of 15° C., and a humidity of 50%) to an icicle, and the icicle was pushed horizontally by the force probe 3 vertical thereto at a constant speed of 2 mm/s. A maximum force ($F_{max}$) of the force probe 3 pushing the icicle is recorded as a force for removing ice from the surface of the sample, and the ice adhesion ($\tau_{ice}$) could be calculated by using the formula $\tau_{ice}=F_{max}/A_{ice}$. The foregoing process was repeated at least three times to ensure its repeatability.

According to the test, the sample has an $F_{max}$ of 2.02N, and a $\tau_{ice}$ of 20.2 kPa.

The invention claimed is:

1. A method for preparing a self-cleaning anti-icing coating based on brushlike organosilicon, comprising the following steps:
   step 1, preparing a modified thiolactone: under nitrogen, mixing a solvent A, a thiolactone, a mercaptoalcohol and a base catalyst A in sequence to obtain a first mixture, and subjecting the first mixture to a thiol-ene addition reaction at ambient temperature for 1-3 hours to obtain the modified thiolactone, wherein a molar ratio of the thiolactone to the mercaptoalcohol is 1:1;
   step 2, preparing a siloxane block: sequentially adding the modified thiolactone, a diamine and a siloxane into a reactor to obtain a second mixture, and subjecting the second mixture to an amino nucleophilic ring opening reaction and a thiol click reaction of thiolactone for 6-24 hours to obtain the siloxane block, wherein a molar ratio of the modified thiolactone to the diamine to the siloxane is 2:1:2;

step 3: preparing a polyurethane matrix: under nitrogen, sequentially adding the solvent A, the siloxane block, a diol, a diisocyanate, a catalyst B and a chain extender into a reactor, and reacting at a temperature of 50-80° C. for 3-12 hours to obtain a polyurethane matrix, wherein a molar ratio of the diisocyanate to a mixture of the diol and the siloxane block to the chain extender is in a range of (2-4):1:(1-3), a molar ratio of the diol to the siloxane block in the mixture of the diol and the siloxane block is in a range of 1:(0.01-0.2), and the solvent A accounts for 30%-80% of the total mass of the solvent A, the siloxane block, the diol, the diisocyanate, the catalyst B and the chain extender; and step 4: preparing a brushlike self-cleaning anti-icing coating: dissolving the polyurethane matrix in the solvent A to obtain a mixed solution with a concentration of 10%-50%, laying the mixed solution on a substrate by using a tape casting method, placing the substrate in a drying oven and heating for 18-36 hours in a gradient heating manner from 50° C. to 120° C. by using an annealing method, and subjecting the substrate after heating to a vacuum drying at 60-80° C. for 6-24 hours to remove remaining solvent to obtain the brushlike self-cleaning anti-icing coating.

2. The method of claim 1, wherein the thiolactone is acrylamide thiolactone.

3. The method of claim 1, wherein the mercaptoalcohol is selected from the group consisting of 3-mercapto-1-propanol, 2-mercaptoethanol and 6-mercapto-1-hexanol.

4. The method of claim 1, wherein the base catalyst A comprises at least one selected from the group consisting of triethylamine, dimethylphenylphosphine and a tributylphosphine basic compound.

5. The method of claim 1, wherein the siloxane is monovinyl-terminated polydimethylsiloxane.

6. The method of claim 1, wherein the solvent A comprises at least one selected from the group consisting of tetrahydrofuran, dioxane and n-butyl acetate.

7. The method of claim 1, wherein the diamine comprises at least one selected from the group consisting of polyetheramine D 400, polyetheramine D 2000 and hexamethylene diamine.

8. The method of claim 1, wherein the catalyst B comprises at least one selected from the group consisting of triethylamine, dibutyltin dilaurate and triethylenediamine basic compound.

9. The method of claim 1, wherein the diisocyanate comprises at least one selected from the group consisting of toluene diisocyanate, isophorone diisocyanate, methylenediphenyl diisocyanate, dicyclohexylmethane diisocyanate, hexamethylene diisocyanate and lysinediisocyanate.

10. The method of claim 1, wherein the chain extender is a diol chain extender selected from the group consisting of ethylene glycol, propylene glycol, 1,4-butanediol, diethylene glycol, 1,4-cyclohexanediol, hydrogenated bisphenol A, terephthalyl alcohol, hydroquinone bis-β-hydroxyethyl ether and resorcinol hydroxy ether.

* * * * *